Jan. 12, 1960  H. LOCKER  2,920,903
WHEEL SUSPENSION
Filed March 26, 1956  4 Sheets-Sheet 1

INVENTOR.
Hans Locker
BY
Harness, Dickey & Pierce
ATTORNEYS

Jan. 12, 1960     H. LOCKER     2,920,903
WHEEL SUSPENSION
Filed March 26, 1956     4 Sheets-Sheet 2
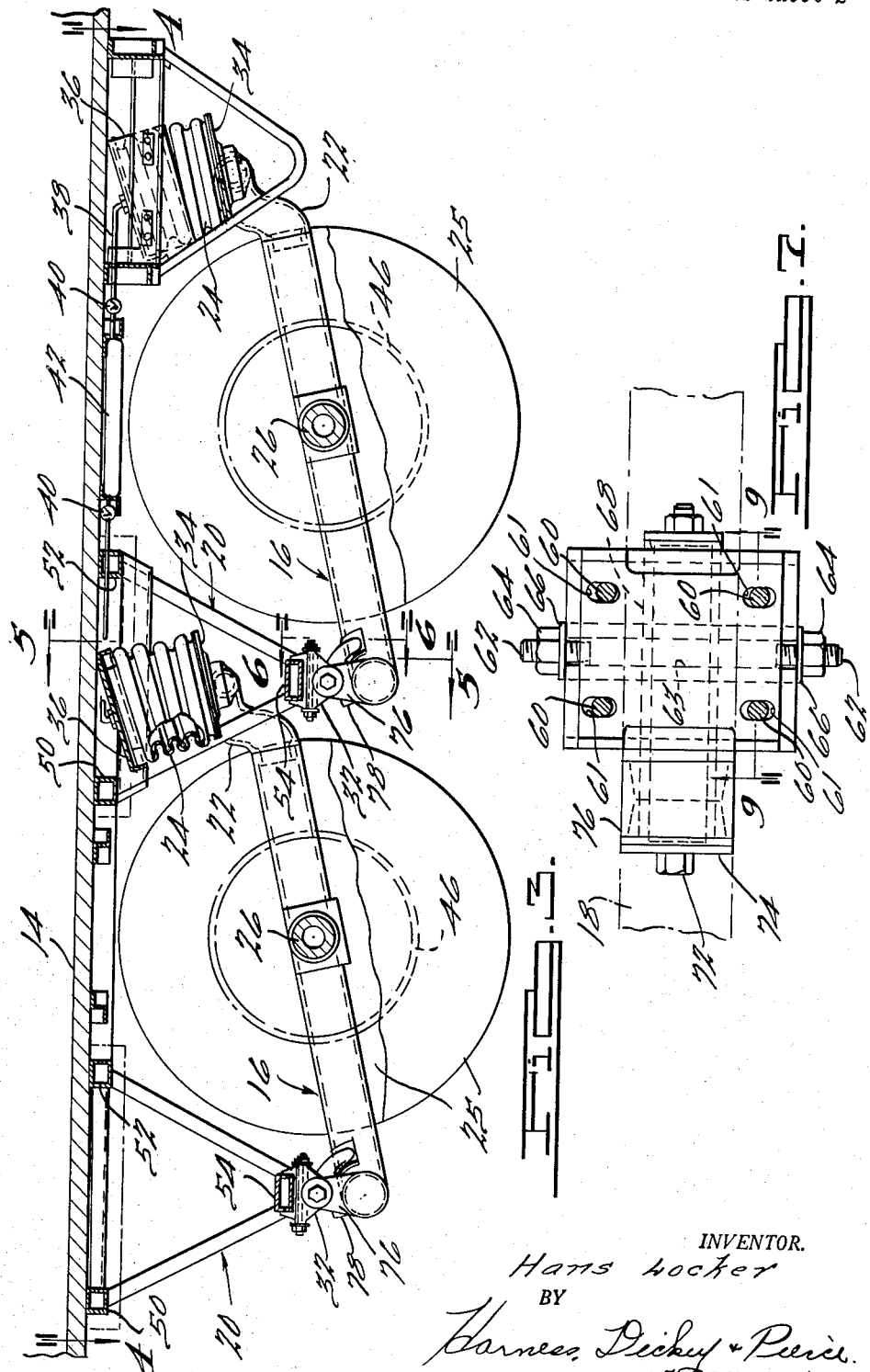
INVENTOR.
Hans Locker
BY
Harness, Dickey & Pierce
ATTORNEYS

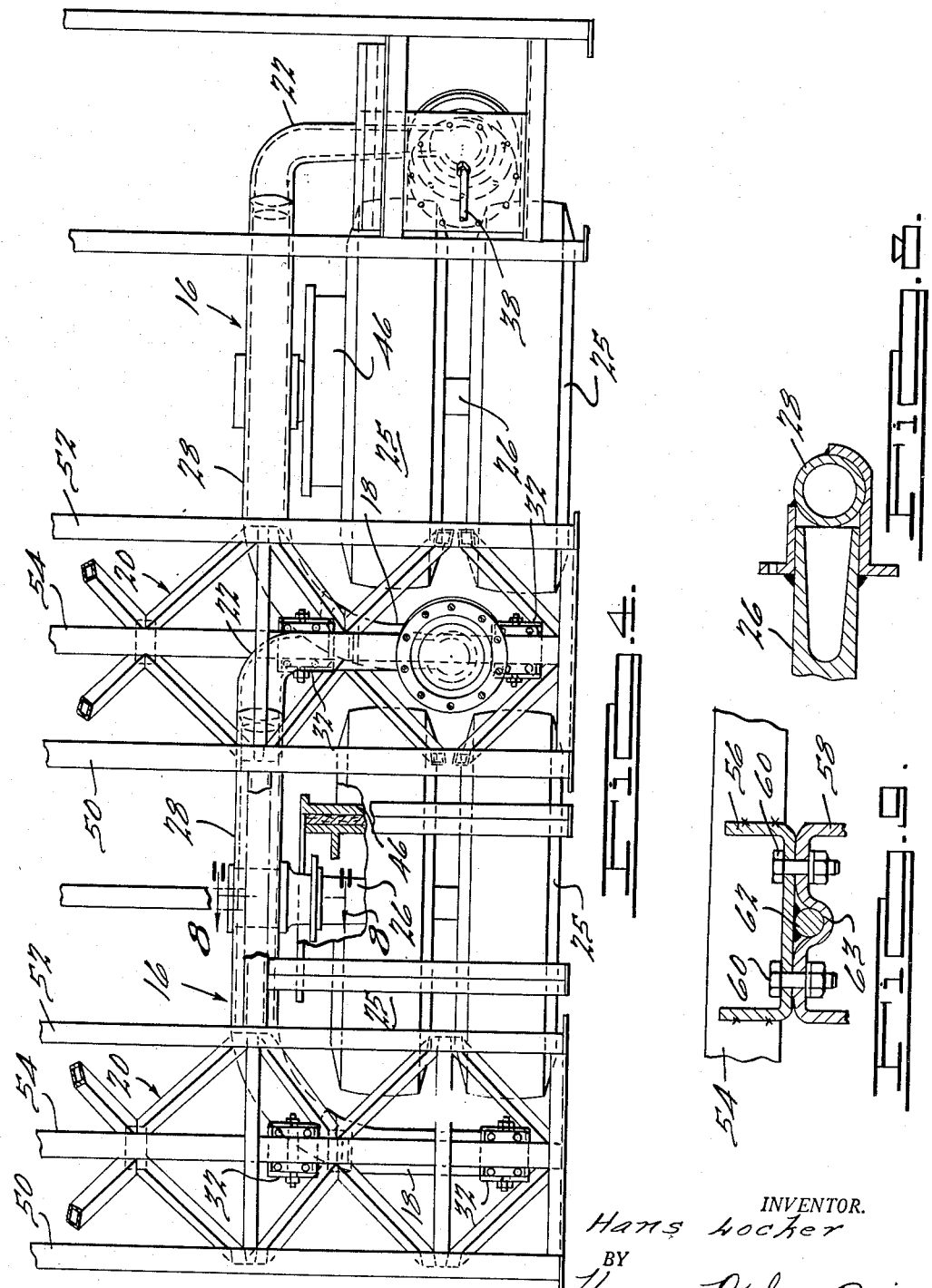

Jan. 12, 1960
H. LOCKER
2,920,903
WHEEL SUSPENSION
Filed March 26, 1956
4 Sheets-Sheet 4
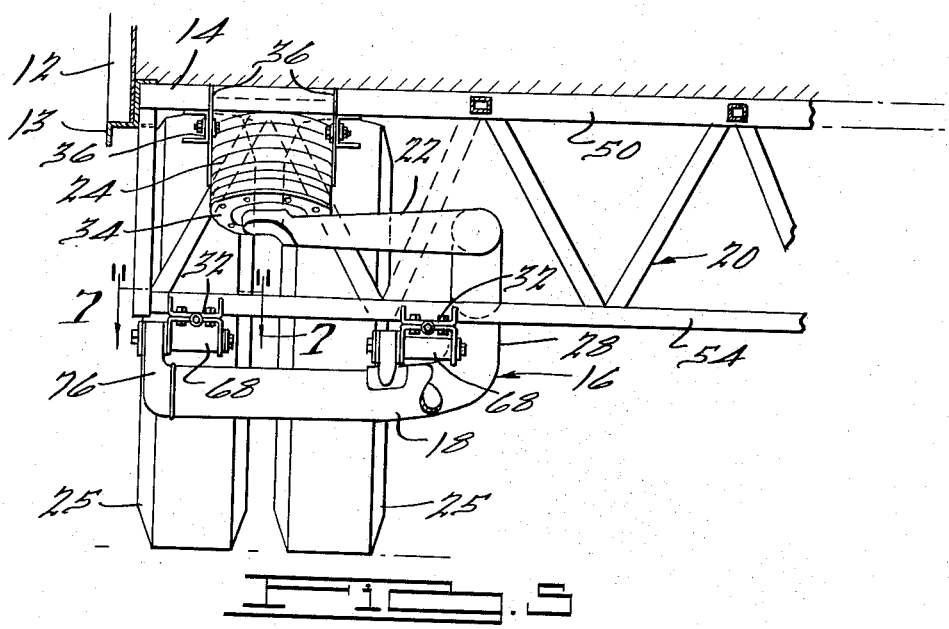
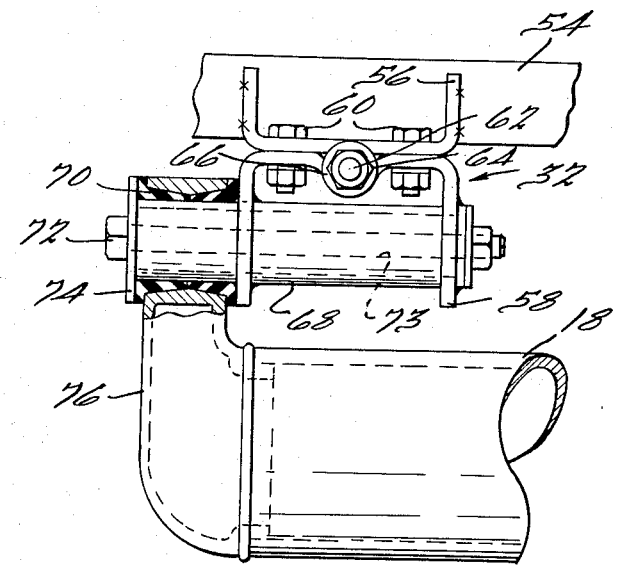
INVENTOR.
Hans Locker
BY
Barnes, Dickey & Pierce
ATTORNEYS

United States Patent Office 2,920,903
Patented Jan. 12, 1960

2,920,903
WHEEL SUSPENSION

Hans Locker, Utica, Mich., assignor to Fruehauf Trailer Company, Detroit, Mich., a corporation of Michigan Application March 26, 1956, Serial No. 573,958

2 Claims. (Cl. 280—104.5)

This invention relates to improved vehicular suspensions and more particularly to improved suspensions for truck trailers, trucks, and the like.

Among the problems encountered in trucks and truck trailers, particularly with respect to the rear load bearing wheels thereof, the problem of adequately cooling brake drums is especially difficult. In hilly regions where the brakes are used extensively, the brake drums frequently become red hot and there have been instances where the brakes have become sufficiently heated to set the tires on fire. One some occasions, in fact, entire truck trailers and their loads have been lost by fire generated by over-heated brake drums. It is calculated that an ordinary trailer brake used at about 30% of capacity generates heat at approximately the same rate as an ordinary household furnace. It will be seen, therefore, that the problem of sufficiently cooling brake drums of truck trailers and trucks is relatively severe. The problem is particularly accentuated in the previous suspensions wherein the brake drums are nestled within bell-shaped wheel bodies and shielded by heavy springs and other structural parts.

Another problem of general concern to truck and truck trailer manufacturers relates to the reduction of weight of the vehicles in order to maximize their load-carrying capacity within the over-all weight limits prescribed by the various States. Still another problem relates to stability of the vehicles. In order to increase stability the suspension support points must be spaced as widely as possible toward the outer walls of the vehicles. Such spacing, however, reduces the space available for inwardly extending brake drums. No truly satisfactory compromise has previously been found between the conflicting requirements for stability and brake cooling.

Accordingly, one object of the instant invention is to improve truck and truck trailer suspensions. Another object is to provide improved truck and truck trailer suspensions of relatively light weight compared to previous suspensions, which improved suspensions also facilitate brake drum cooling. Another object is to provide improved vehicular suspensions which directly support the bodies of the vehicles at points closely adjacent to the outer walls thereof to provide the greatest possible degree of stability, and also to permit the use of lighter body construction, thereby achieving a further increase in load carrying capacity.

These and other objects are accomplished by the instant invention which provides an improved suspension for trucks, truck trailers and the like comprising an arcuate lever arm pivoted at one end and resiliently supported at the other upon the frame of the vehicle. A load-bearing wheel is supported between the ends of the lever upon an axle mounted thereon. The ends of the lever are attached to the vehicle frame near the side walls thereof. The central portion of the lever is bent sharply inwardly so that the axle is supported near the center line of the vehicle, thus providing a large amount of space for a relatively large brake drum to fit between the wheel and the lever. The brake drums of wheels mounted according to the invention, moreover, are relatively unobstructed and have free access to air flow for superior cooling. The lever arms are supported near the side walls of the vehicle body to provide maximum stability, to take advantage of the structural strength of the side walls, and to permit the use of relatively light structural cross members in the body frame. Optimum results are achieved when the lever arms are secured to the vehicle body at points substantially aligned with the center lines of the wheel tracks.

The invention will be described in greater detail in connection with the accompanying drawing of which:

Fig. 3 is a broken, cross-sectional view of the trailer shown in Fig. 2 taken along the section line 3—3 thereof;

Fig. 4 is a cross-sectional view of the suspension shown in Fig. 3 taken along the section line 4—4 thereof;

Fig. 5 is a cross-sectional view of the suspension shown in Fig. 3 taken along the section line 5—5 thereof;

Fig. 6 is a cross-sectional view of the suspension shown in Fig. 3 taken along the section line 6—6 thereof;

Fig. 7 is a cross-sectional view of the suspension shown in Fig. 5 taken along the section line 7—7 thereof;

Fig. 8 is a cross-sectional view of a portion of the suspension, as shown in Fig. 4, taken along the section line 8—8 thereof; and Fig. 9 is a cross-sectional view of the portion of the suspension shown in Fig. 7 taken along the section line 9—9 thereof.

Figure 1:
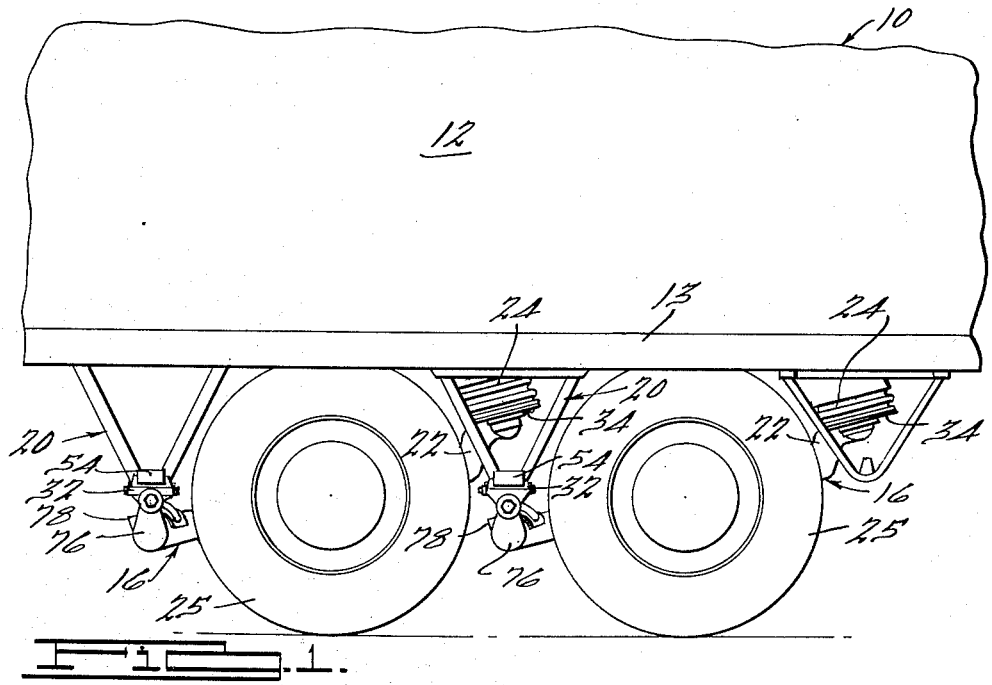
Figure 1 is a fragmentary, side elevational view of a truck trailer including a suspension according to the instant invention.
Figure 2:
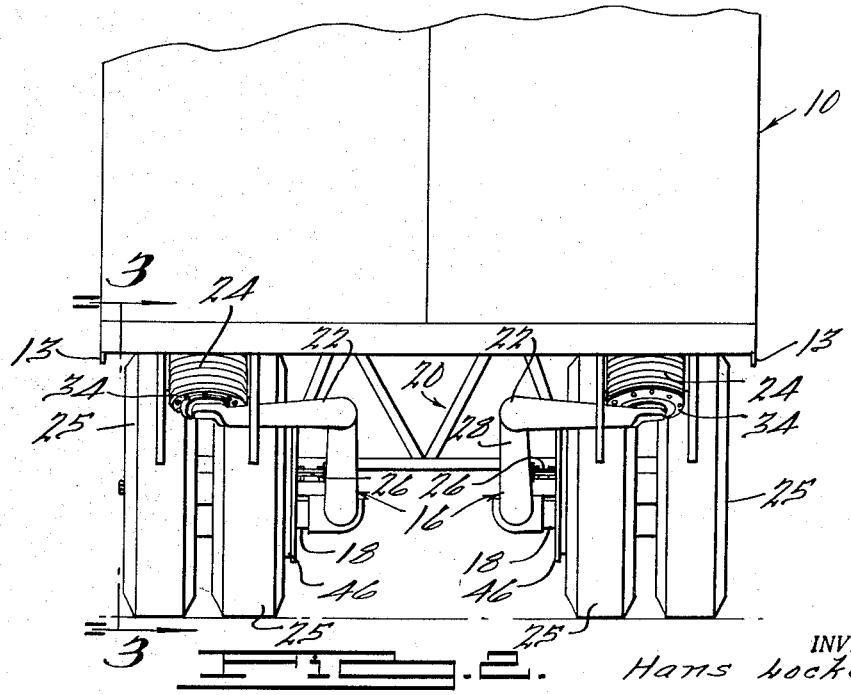
Fig. 2 is a rear, elevational view of the truck trailer shown in Fig. 1.

Referring now to Figs. 1-4, a truck trailer body 10 is shown mounted upon suspensions according to the invention. The trailer may be of any desired type and construction, but is preferably of the type shown, being a van including side walls 12 and a load supporting floor 14. The trailer shown includes four individual suspensions, and has two sets of dual wheels mounted in tandem. This arrangement, however, is illustrative only, and, as may readily be seen, suspensions according to the invention may be arranged in any desired manner to provide any desired support for a vehicle body. This feature provides a high degree of flexibility in manufacture since the parts used are identical whether the wheels are mounted in tandem or singly. It is not necessary to provide two different constructions, one for a single wheel, and one for a tandem wheel arrangement as in certain previous constructions.

Each suspension upon which the body 10 is mounted comprises a generally U-shaped lever 16, the forward leg 18 of which is pivoted upon a transverse truss 20 secured directly to the floor 14 of the body. The rear arm 22 of the lever is secured to the floor 14 of the body by a resilient spring 24, which may be of the pneumatic bellows type, as shown. Dual load-bearing wheels 25 are supported between the two legs 18 and 22 of the lever upon an axle 26 secured to the staff, or base leg 28 of the lever.

The body 10 is thus supported near its sides rather than at points close to its center line with a resulting increase in stability and decrease in strains and stresses imposed upon the floor 14 of the body. This permits the use of relatively light cross members such as the truss 20, and effects an increase in the pay-load capacity of the trailer. At the same time the axles are mounted inwardly, toward the center of the body 10 to allow room for a relatively large brake drum 46 that may extend inwardly away from the wheels a substantial distance. Not only may relatively large brake drums be used in a suspension according to the invention, but they are more exposed to air flow and more efficiently cooled during operation. Also, the wheels may be set inwardly from the longitudinal, side frame members 13 of the body 10, thus eliminating previously necessary vertical cutouts, or notches in the members 13 and increasing the strength of the trailer without sacrificing stability. Moreover, the heavy longitudinal sub-frame previously used for truck and truck trailer suspensions is eliminated, the present suspension being directly supported upon the floor of the truck body, thus reducing the total weight of the trailer.

The base leg 28 and the forward leg 18 of the lever 16 may be formed integrally from a single piece of drawn tubing. The rear leg 22 may be a casting, or forging welded to the base leg 28. The forward leg 18 of the lever is pivoted upon the truss 20 by a pair of adjustable brackets 32, to be described in greater detail hereinafter. The rear leg 22 is directly affixed to the impact plate 34 of a pneumatic bellows type spring 24 which is directly affixed by means of a pair of brackets 36 to the floor 14 of the body. The pneumatic bellows 24 on the different respective individual suspensions of the vehicle may be interconnected, as by tubing 38 leading through restrictor valves 40 and surge tanks 42, to provide any desired degree of snubbing for and equalizing action between the suspensions.

An axle stub 26 is secured, as by welding, at about the center of the base leg 28 of the lever to mount dual load-supporting wheels 25 between the forward and rear legs 18 and 22, respectively, of the lever 16. The axle stub 26 is sufficient in length and is arranged to support the wheels 25 sufficiently far from the base leg 28 to provide room for a relatively large brake drum 46 between the base leg 28 and the wheels. This spacing, of course, increases the torque imposed upon the base leg 28 so that the lever 16 must be made relatively strong and rigid.

The truss 20 that supports the forward leg 18 of the lever 16 may be of any desired construction sufficiently strong to support the dynamic loads impressed upon it. In the example shown, it is of relatively light-weight box girder construction and triangular in longitudinal section, being supported upon two cross members 50 and 52 of the truck floor. It terminates at its lower end in a single structural member 54 that extends completely across the width of the vehicle and to which are attached the supporting brackets 32 for the forward legs 18 of the lever.

The brackets 32, as best shown in Figs. 6, 7 and 9, include an upstanding channel member 56 welded to the cross member 54 of the truss 20. A depending channel member 58 is attached to the upstanding channel 56 by bolts 60 which pass through elongated slots 61 in the upper channel 56 so that the lower channel 58 is longitudinally movable along the length of the vehicle when the bolts 60 are loosened. The upper and lower channels 56 and 58, respectively, may be moved and locked in position with respect to each other by means of a stud and nut arrangement. Studs 62 are welded upon the lower surface of the upper channel 56 and are freely slidable within a groove 63 in the upper surface of the lower channel 58. Lock nuts 64 are threaded on the studs 62 and engage the lower channel 58 through a pair of washers 66. Thus, when one of the nuts 64 is loosened and the other tightened, the lower channel 58 may be driven forwardly or backwardly upon the upper channel 56 to adjust the longitudinal position of the wheels 25.

The lever 16 is pivoted at its forward end directly upon the trailer frame, and is spung at its rearward end, so that the wheels 25 are trailing and track better than do wheels in previous conventional suspensions. A pivot tube 68 disposed transversely of the trailer body is rigidly supported by the lower channel 58 of the bracket 32, and carries at one end thereof a relatively soft, resilient bushing 70 which may, for example, be of rubber. The bushing 70 is firmly secured upon the pivot 68 by a washer 74 retained by a bolt 72. A supporting arm 76 for the forward leg 18 of the lever rides upon the bushing 70. The bushing 70 acts during operation of the vehicle as a low amplitude shock absorber and vibration damper, and also imparts some flexibility to the suspension to aid in steering of the vehicle and to minimize tire scuffing.

The arm 76, as shown in Fig. 6, may be a casting fitted and welded to the end of the leg 18 at the outboard side of the vehicle. The inboard support (not shown in detail) for the leg 18 may comprise a sheet metal structure or a casting, as desired, pivoted in like manner as the outboard support upon a bracket 32 and welded, or otherwise secured to any convenient part of the forward leg 18 spaced inwardly from the outboard arm 76. Pivot tubes 68 of both the inboard and the outboard supports are aligned transversely of the vehicle so as to support the lever 16 in free vertical swinging movement. Also, the pivot mountings of the two supports preferably are spaced substantially equidistantly on opposite sides of the wheel track to distribute the load uniformly on the two bearings and to assure a balanced pulling action on the wheels 25. In this connection it should perhaps be pointed out that the "wheel track" of a single wheel, as the term is used in the trailer art, is the center of the track made by the wheel. In the case of a dual wheel arrangement of the type here shown, the "wheel track" is a line midway between the tracks made by the two wheels. Also, the spring 24 of each suspension preferably is mounted on the track of the wheel or wheels with which it is associated so as to assure a balanced condition. By balancing both the pivot supports and the spring mounting of the suspension with respect to the wheel track an essentially true caster action is obtained for the wheel and the latter tends to align itself automatically with the direction of travel of the trailer and to maintain proper alignment at all times. Also, this arrangement places the spring centers approximately on the wheel track and relatively close to the outside wall 12 of the body 10. The term "spring centers" may be defined as the point at which a line interconnecting the spring and the pivot connection of the suspension crosses the axle. In the instant environment such a line passes through the center of the spring 24 and midway between the inboard and outboard supporting brackets 32. It has been observed that the lateral stability of a trailer varies directly as the square of the distance between the spring centers, viz., between the centers of the springs on opposite sides of the trailer. Thus it is desirable to obtain a wide spacing between the spring centers to assure maximum lateral stability for the trailer. The instant construction permit the spring centers to be maintained relatively far apart with the wheels 25 disposed inwardly of the longitudinal side frame member 12 as shown in Fig. 5. This permits the use of a straight side frame member. It is not necessary to break or interrupt the side frame member with an upwardly arched portion to provide a well or clearance for the wheel. Manifestly, the straight frame construction is much stronger and adequate strength may be achieved by a relatively light weight underframe construction. The use of a light under frame construction is made further possible by the close proximity of the outboard bearing support 32 to the side wall 12 which utilizes the relatively great vertical strength and rigidity of the side wall as a part of the supporting frame structure for the suspension and minimizes the bending stresses otherwise imposed on the transverse frame members. The narrow subframe heretofore almost universally used and the attendant narrow spring centers are eliminated entirely by this construction.

The brackets 32 are movably mounted for longitudinal adjustment so that the wheels of the vehicle may be readily aligned to insure smooth, steady, and even tracking without sideway or whipping. To facilitate this adjustment the invention also provides alignment means so that the wheels on opposite sides of the vehicle may be aligned with each other. These means include an aperture 73 that extends through the length of the pivot tube 68. This aperture is normally occupied by a retaining bolt 72, but for purposes of alignment the retaining bolt 72 is removed and a rigid rod (not shown) is positioned within the aperture 73. The rod is dimensioned to fit accurately into the aperture without side play. It is extended transversely across the vehicle through successive one of the pivot tube apertures 73 to align both the left and right suspensions, both angularly and longitudinally with respect to the truck body 10. The brackets 32 are adjusted longitudinally as the rod is extended until the pivot tubes 68 on both sides of the vehicle are accurately aligned one with the other. If suitable equipment is available, this alignment may be done equally well by optical means, and for this purpose accurately machined bosses 78 are provided on the arms 76 (see Figs. 1 and 3) extending forwardly therefrom and accurately spaced from the pivot tube apertures 73. Thus, the wheels may readily and easily be aligned with respect to each other and to the body 10 by relatively simple mechanical or optical means. It will be appreciated that the truss 20 is not essential in the practice of the invention. If desired, the lever arm 16 may be pivoted directly upon one of the cross members 50 and 52 of the floor 14. This construction would, of course, require a lever arm of somewhat different shape from that shown, but the basic principle remains unchanged. The truss construction is generally preferred, however, particularly for trailers designed for relatively heavy loading, because it spreads the load over a larger floor area and permits use of lighter longitudinal floor members. Also, the truss construction places the pivot connection of the lever 16 substantially below the floor of the trailer body and this produces beneficial results when braking and when backing the trailer. For optimum benefit the pivot connection of the lever 16 should be approximately level with the centers of the wheels 25 as shown in the drawings. If the pivot connections 32 are spaced substantially below the floor of the trailer there is much less tendency for the levers 16 to lift the trailer body 10 when backing the trailer in the event the wheels strike an obstruction such as a rock, a curbing or a chuck hole. This in turn means that the sub-frame of the trailer body need not be strengthened sufficiently to withstand heavy lifting pressures and the net result is a reduction in the weight of the frame, a saving in the cost of manufacture and an increase in the permissible pay load of the trailer body. Also, there is much less tendency for the trailer body 10 to squat or bear down on the supporting springs and bearings when the brakes are applied to check forward motion of the trailer. Manifestly, lessening of these effects materially reduces wear and strain on the springs and bearings.

While the invention has been described in connection with a truck trailer having two sets of dual wheels arranged in tandem on each side, it is equally advantageous in other types of vehicles such as trailers having other wheel arrangements, and self-propelled trucks.

What is claimed is:

1. A vehicle comprising a load-carrying body having a floor structure, and a wheel supported upon a stub axle, said axle being mounted upon a lever between the ends thereof, one end of said lever being resiliently affixed to said floor structure at a point substantially directly above the wheel track center line, and the other end of said lever being pivoted upon an adjustable bracket secured to said floor structure at another point substantially directly above the wheel track center line, said bracket being movable longitudinally with respect to said floor structure and including locking means rigidly to secure said bracket in a selected position with respect to said floor structure.

2. A vehicle comprising a load-carrying body having a floor structure, and a plurality of wheels supported upon axles at opposite sides of said floor structure, each one of said axles being supported upon a separate lever between the ends thereof, one end of each of said levers being resiliently affixed to said floor structure, and the other end of each of said levers being pivoted upon an adjustable bracket attached to said floor structure, each one of said brackets defining an elongated aperture disposed transversely to the length of said floor structure and adapted to receive an alignment road and to hold said rod in a fixed position with respect to said bracket to facilitate the alignment of said bracket with other ones of said brackets.

References Cited in the file of this patent

UNITED STATES PATENTS

| | | |
|---|---|---|
| 2,101,545 | Jacob | Dec. 7, 1937 |
| 2,441,807 | Francis | May 18, 1948 |
| 2,713,498 | Brown | July 19, 1955 |
| 2,764,421 | Ronning | Sept. 25, 1956 |

FOREIGN PATENTS

| | | |
|---|---|---|
| 134,182 | Australia | Sept. 7, 1949 |